Jan. 2, 1962 A. B. ANDERSON 3,015,530
MECHANIC'S TRAY ARRANGEMENT
Filed June 6, 1960 2 Sheets-Sheet 1
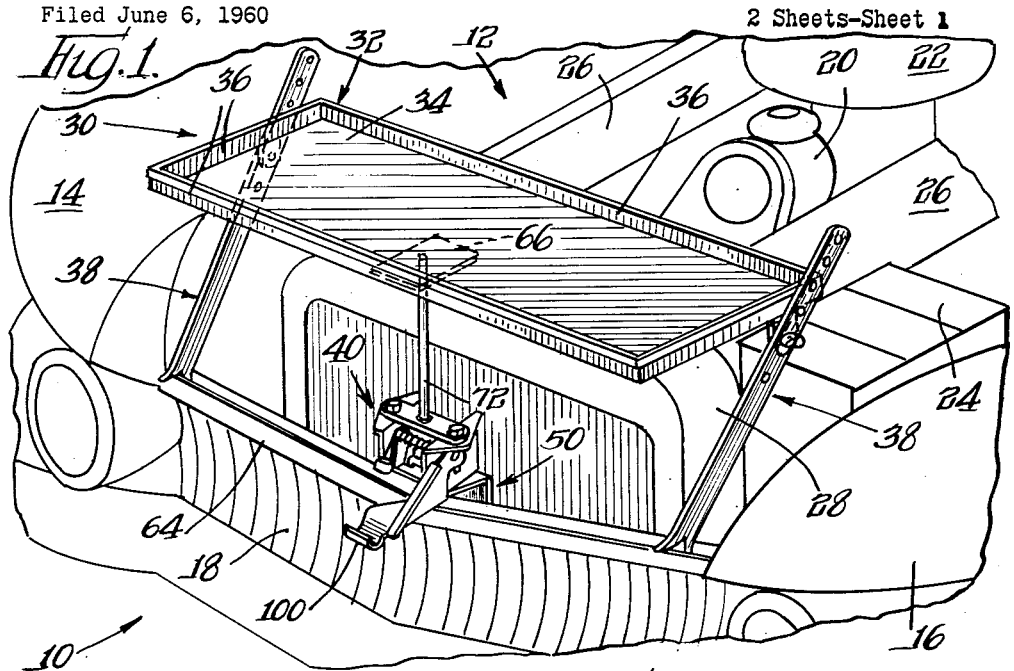
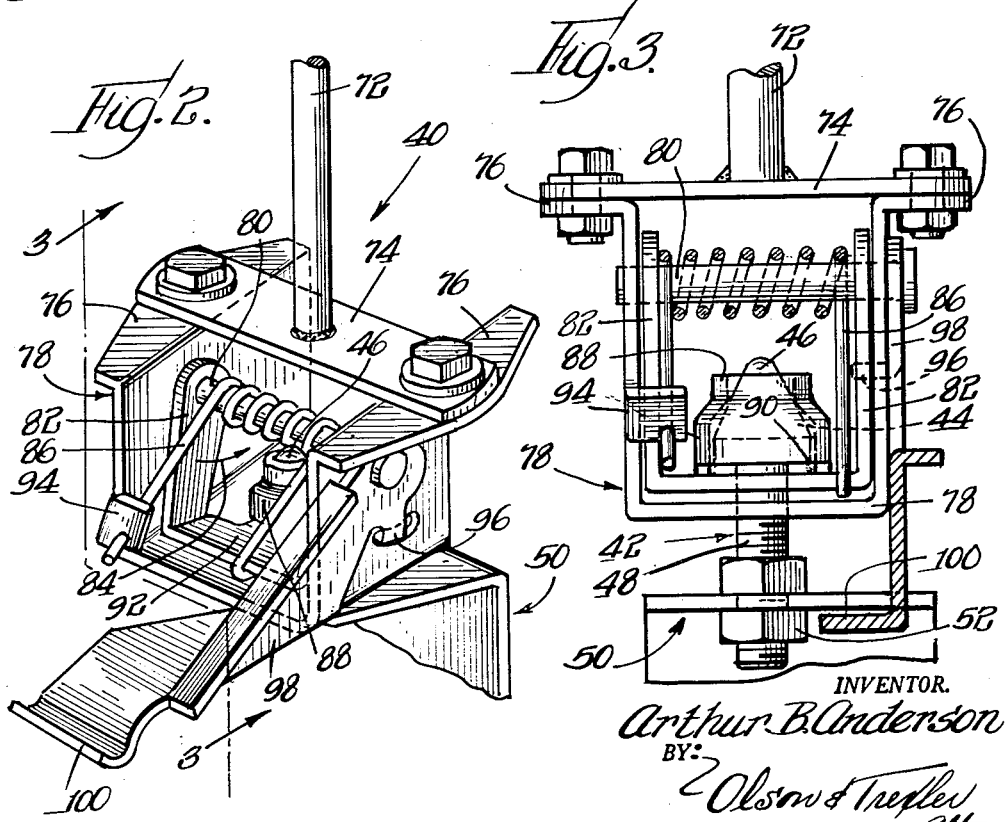
INVENTOR.
Arthur B. Anderson
BY: Olson & Trexler
Attys.

Jan. 2, 1962     A. B. ANDERSON     3,015,530
MECHANIC'S TRAY ARRANGEMENT
Filed June 6, 1960     2 Sheets-Sheet 2
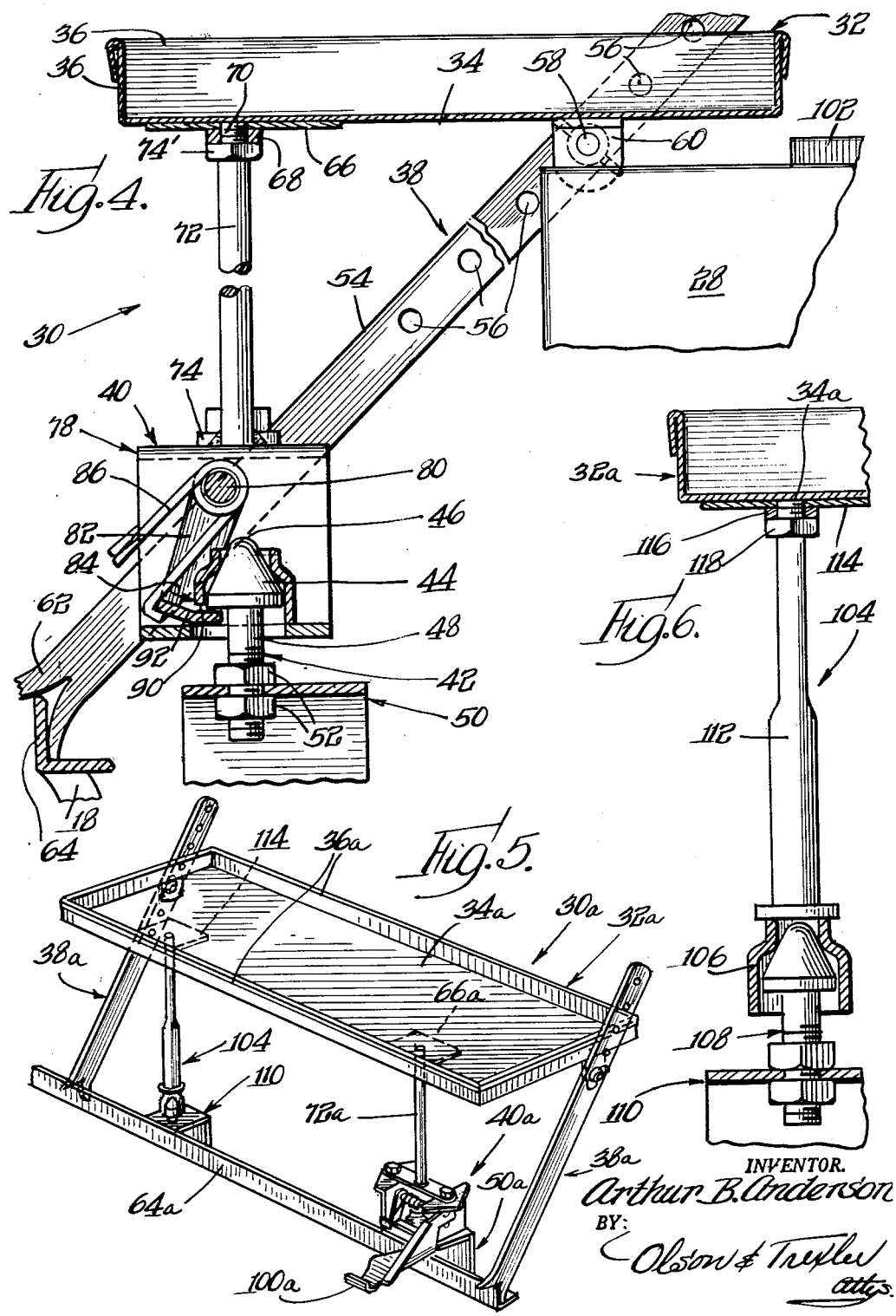
INVENTOR.
Arthur B. Anderson
BY:
Olson & Trexler
attys.

United States Patent Office 3,015,530
Patented Jan. 2, 1962

3,015,530
MECHANIC'S TRAY ARRANGEMENT
Arthur B. Anderson, 2143 N. Keystone Ave.,
Chicago 39, Ill.
Filed June 6, 1960, Ser. No. 34,267
5 Claims. (Cl. 311—21)

This invention relates generally to a tray arrangement for automotive tools, parts and supplies and more particularly to such a tray arrangement that is attachable to an automobile so as to be accessible to a mechanic working in the engine compartment.

In one specific aspect, the present invention relates to a mechanic's tray arrangement that is adapted for use with the positionally fixed portion of an automobile hood latching mechanism after the hood has been raised.

Mechanic's tray arrangements of the type described have been known and built previously; and these prior art trays have been commonly arranged to cooperate with a hood latching mechanism incorporating a lock assembly that is fixed adjacent the front end of the engine compartment. However, modern automotive construction practice secures the lock assembly of the hood latching mechanism to the hood itself while situating the cooperating striker stud in a fixed position adjacent the decorative grill, i.e. while situating the striker stud where the lock assembly was formerly located. Accordingly, prior art mechanic's tray arrangements have become obsolete and no longer enjoy wide fields of utility.

Modern automotive construction practice also dictates disposition of the fixed portion of the hood latching mechanism substantially beneath a line joining the top of the fenders whereas previously this fixed portion was situated approximately level with that line. Moreover, while automotive construction practice has heretofore been restricted to the use of a single hood latching mechanism, dual latching mechanisms are now not uncommon.

Therefore, an important object of the present invention is to provide a new and improved mechanic's tray arrangement that is adapted to cooperate with modern automotive construction practices.

Another object of the invention is to provide a new and improved mechanic's tray arrangement which is mounted to an automobile in association with the positionally fixed portion of the hood latching mechanism.

Yet another object of the invention is to provide a mechanic's tray arrangement that is stable and not susceptible of tipping.

A further object of the invention is to provide a mechanic's tray arrangement which is adjustably levelable.

A still further object of the invention is to provide a mechanic's tray arrangement that is adapted to be mounted adjacent the engine compartment spaced from the radiator to preclude the existence of a conductive path from hot radiator fluids to the contents of the tray.

A still further object of the invention is to provide a mechanic's tray arrangement that is easy to make and convenient to use.

One specific object of the invention is to provide a mechanic's tray arrangement that is adapted to cooperate with a dual, hood latching mechanism.

Additional objects and features of the invention pertain to the particular structure and arrangements whereby the above objects are attained.

A structure in accord with the invention includes a tray having a horizontally disposable bottom and having sides upstanding about the edges of the bottom, the tray being adapted to be spaced apart from the radiator of an automobile extending forwardly therefrom; means for receiving the fixed striker stud means of the hood latching mechanism, including a lock assembly, the receiving means being attached to the tray adjacent a forward portion thereof and spaced therebeneath extending vertically into gripping engagement with the striker stud means; and leg means originating adjacent lateral sides of the tray rearwardly of the receiving means and extending in a diagonally forward direction to engage a structural element of the automobile for supporting the tray in a stable position, the leg means being selectively fastenable to the tray for adjustable leveling thereof.

The invention, both to its structure and mode of opertion, will be better understood by reference to the following disclosure and drawings forming a part thereof, wherein:

FIG. 1 is a perspective view of an automobile with the hood raised to reveal the engine compartment, there being a mechanic's tray arrangement mounted in place in accord with the present invention;

FIG. 2 is an enlarged perspective view of the lock assembly used in the mechanic's tray arrangement of FIG. 1;

FIG. 3 is a further enlarged view taken through the section 3—3 of FIG. 2;

FIG. 4 is an enlarged, central, cross-sectional view in side elevation of the mechanic's tray arrangement of FIG. 1;

FIG. 5 is a perspective view illustrating a modified form of the mechanic's tray arrangement of the invention; and FIG. 6 is an enlarged, side-elevational view in partial cross-section showing the pedestal means of the arrangement of FIG. 5.

Referring now in detail to the drawings, specifically to the embodiment illustrated in FIGS. 1-4, an automobile indicated generally by the numeral 10 will be seen to have an engine compartment 12 situated between fenders 14 and 16 and behind a decorative grill 18. A hood, not shown, is arranged to cover the engine compartment 12, being mounted for swingable operation adjacent the rearward portion of the engine compartment. In compliance with customary practice, the engine compartment 12 contains an electric generator 20, an air cleaner 22, an electric storage battery 24 and an internal combustion engine 26, the engine 26 being illustrated as a V-8 type. In further compliance with customary practice, engine 26 is of water-cooled design; and the cooling system for engine 26 incorporates a radiator 28 situated behind the grill 18.

In the ordinary course of maintaining and repairing the automobile 10, numerous occasions will arise wherein the components housed within the engine compartment 12 will require attention. Therefore, in accord with the present invention, a mechanic's tray arrangement indicated generally at 30 is provided for situation advantageously overlying at least a portion of the radiator 28 spaced apart and extending forwardly therefrom as illustrated. The tray arrangement 30 is adapted to store the automotive tools, parts and supplies which a mechanic finds necessary when working in the engine compartment 12.

The tray arrangement 30 includes a tray structure 32 comprising a bottom 34 arranged to be disposed in a generally horizontal attitude and comprising sides 36 upstanding from the edges of bottom 34. The tray arrangement 30 also includes leg means 38 originating from opposite lateral sides of the tray structure 32, further including a lock assembly 40 for receiving the positionally fixed, striker stud 42 of the automobile hood latching mechanism.

With particular reference to FIG. 4, the striker stud 42 will be seen to comprise a conical head 44 having a rounded tip 46 and a shank 48 which is threaded at its free end so that the stud 42 may be mounted to a bracket 50 by means of cooperatively threaded nuts 52. The bracket 50 is arranged to situate striker stud 42 slightly above and slightly to the rear of the top edge of grill 18. There, the stud 42 may easily cooperate with the lock assembly which is secured to the hood of automobile 10.

Continuing with reference to FIG. 4, each of the leg means 38 will be seen to include a brace bar 54 which is provided with a number of apertures 56 spaced along its longitudinal axis. The holes 56 are adapted to pass a bolt 58, bolt 58 entering a cooperating aperture in an ear 60. Ears 60 are affixed to depend from the bottom 34 of tray structure 32, and bolts 58 are secured by wing nuts or other suitable fasteners.

The brace bar 54 has a split tip 62 which engages a frame member 64 of grill 18. It is to be noted that the ears 60 are disposed generally rearwardly of the lock assembly 40 and that the brace bar 54 extends in a diagonally forward and downward direction intercepting the plane of the lock assembly 40 to engage frame member 64 forwardly of the striker stud 42. This preferred arrangement of the leg means 38 and the lock assembly 40 establishes a highly stable configuration of the tray structure 32.

A plate 66 is secured to the underside of bottom 34 as by spot welding, and a boss 68 is fixed to the plate 66 defining a tapped aperture 70. The cooperatively threaded end of a post 72 enters aperture 70, and a lock nut 74' secures post 72 in a generally vertically depending relationship to the bottom 34 of tray structure 32; and referring now to FIGS. 2 and 3, the post 72 will be seen welded to a plate 74. Plate 74 is, in turn, bolted to the flanges 76 of a U-shaped frame 78, post 72 and frame 78 comprising elements of the striker stud receiving means of the invention.

A pivot shaft 80 is fixed to the frame 78 extending horizontally between opposite sidewalls, and a yoke 82 is swingably mounted to shaft 80 inside the frame 78 to be biased in the direction of arrow 84 by a torsion spring 86. A thimble 88 is fastened to the floor of frame 78 over a striker stud passing aperture, thimble 88 being arranged to receive the head 44 of striker stud 42 as is indicated generally in FIG. 3. The thimble 88 is provided with a horizontal, forwardly opening slot 90 disposed adjacent the floor of frame 78; and yoke 82 includes a tongue or keeper portion 92 which is adapted to enter slot 90 beneath the head 44 of striker stud 42 for purposes of locking the stud with respect to thimble 88. Spring 86 is arranged to bias the keeper portion 92 into the slot 90 as by having one end formed over the forward edge of keeper portion 92 and by having the other end restrained by an arm 94 as is well indicated in FIG. 2.

In order to release striker stud 42 from the receiving means 40, a trip arm 96 passes through an aperture in the sidewall of frame 78 to be operated by means of an actuating lever 98 which is pivotally mounted to the shaft 80. A handle 100 is formed at the forward end of lever 98, and a lifting up of the handle 100 causes trip arm 96 to urge the keeper portion 92 of yoke 82 out of the slot 90 and from beneath the head 44 of striker stud 42.

From the descriptions thus far given, it is apparent that, when it is desired to perform mechanical work within the engine compartment 12, tools, components and supplies can be held readily accessible by means of the tray arrangement 30. Specifically, after the hood of the automobile 10 has been raised, the tray arrangement 30 may be installed by urging the lock assembly 40 over the positionally fixed striker stud 42, the conical head 44 of striker stud 42 entering thimble 88 to be locked in place by means of the keeper portion 92 entering slot 90 and being biased in such position by means of the torsion spring 86.

Thereafter, the split tips 62 of the brace bars 54 will be positioned in engagement with the frame member 64; and if the bottom 34 of tray structure 32 is canted, the wing nuts fastening bolts 58 can be loosened permitting a different hole 56 to be aligned with the ear 60 in order to adjust the bottom 34 into an approximately level condition. By virtue of the crossing relationship established between the plane of leg means 38 and the plane of lock assembly 40, tray structure 32 is established in a stable configuration; and should the mechanic inadvertently lean on the tray structure, it will not tip spilling its contents. It is to be furthermore observed that the tray 32 is spaced from the radiator 28 in order to preclude the existence of a conductive path from hot radiator fluids to the contents of the tray. In addition, the tray 32 is arranged to be situated so that it does not obstruct the cap 102 of the radiator 28 in accordance with the showing of FIG. 4.

When the mechanical work has been completed, the tray arrangement 30 can be released for removal merely by lifting the handle 100 whereby arm 96 will urge the keeper portion 92 out of the slot 90; and thereafter, simple vertical lifting of the tray structure 30 will affect its removal from automobile 10.

For those situations wherein an automobile incorporates a dual, hood latching mechanism, the tray arrangement 30 is modified as shown in FIGS. 5 and 6. There, a tray arrangement 30a presents a lock assembly 40a in off-centered relationship as shown in FIG. 5. Other elements of the arrangement 30a which are similar to the elements of arrangement 30 have been indicated by like numerals to which the suffix letter "a" has been affixed. A pedestal means 104 is secured in depending relationship from the bottom 34a of tray structure 32a spaced laterally apart from the lock assembly 40a; and as is well shown in FIG. 6, the pedestal means 104 includes a thimble portion 106 which receives a duplicate striker stud 108. Stud 108 is mounted to a bracket 110 upstanding parallel with the striker stud 42a and spaced apart therefrom. In other respects the striker stud 108 is similar to the striker studs 42 and 42a.

The thimble 106 is affixed to a shaft 112 which, in turn, is connected to the bottom 34a by means of a plate 114 which is affixed to the bottom 34a, as by spot welding, and by means of a boss 116 which defines a tapped aperture into which the threaded end of shaft 112 is fitted. Advantageously, a lock nut 118 is employed in securing the shaft 112 in position with respect to the boss 116. The pedestal means 104 is arranged to provide balanced support of the tray structure 32a, and the thimble 106 slidably receives the striker stud 108 without provision of locking means. In other respects, the tray arrangement 30a operates similarly to the tray arrangement 30.

While particular embodiments of the invention have been shown and described, it should be understood, of course, that the invention is not intended to be limited thereto since many modifications may be made; and it is, therefore, contemplated to cover by the appended claims any such modifications as fall within the true spirit and scope of the invention.

The invention is claimed as follows:

1. A mechanic's tray arrangement for use with an automobile hood latching mechanism, said arrangement comprising: a tray structure adapted to be spaced apart from the radiator of an automobile and extending forwardly therefrom; means for receiving the fixed striker stud means of said hood latching mechanism, including a lock assembly and an elongated rod joined between said lock assembly and tray, said receiving means being attached to said tray structure adjacent a forward portion thereof and spaced therebeneath extending into gripping engagement with said striker stud means; and leg means originating adjacent opposite lateral sides of said tray structure rearwardly of said receiving means and extending in a diagonally forward direction intercepting the plane of said receiving means to engage a structural element of said automobile forwardly of said striker stud means for supporting said tray structure in a stable position.

2. A mechanic's tray arrangement for use with an automobile hood latching mechanism, said arrangement comprising: a tray structure adapted to be spaced apart from the radiator of an automobile and extending forwardly therefrom; means for receiving the fixed striker stud means of said hood latching mechanism, said receiving means being attached to said tray structure adjacent a forward portion thereof and spaced therebeneath extending into gripping engagement with said striker stud means; and leg means fastened to opposite lateral sides of said tray structure rearwardly of said receiving means and extending in a diagonally forward direction intercepting the plane of said receiving means to engage a structural element of said automobile forwardly of said striker stud means for supporting said tray structure in a stable position, said leg means being selectively fastenable to said tray structure for adjustable leveling thereof.

3. A mechanic's tray arrangement for use with an automobile hood latching mechanism, said arrangement comprising: a tray structure including a horizontally disposable bottom having sides upstanding thereabout, said structure being adapted to overlie at least a portion of the radiator of an automobile spaced apart and extending forwardly therefrom; means for receiving the fixed striker stud means of said hood latching mechanism, including a lock assembly, said receiving means being attached to said tray structure adjacent a forward portion thereof and spaced therebeneath extending into gripping engagement with said striker stud means; and leg means fastened to opposite lateral sides of said tray structure rearwardly of said receiving means and extending in a diagonally forward direction intercepting the plane of said receiving means to engage a structural element of said automobile forwardly of said striker stud means for supporting said tray structure in a stable position.

4. A mechanic's tray arrangement for use with an automobile hood latching mechanism, said arrangement comprising: a tray structure including a horizontally disposable bottom having sides upstanding thereabout, said structure being adapted to overlie at least a portion of the radiator of an automobile spaced apart and extending forwardly therefrom; means for receiving the fixed striker stud means of said hood latching mechanism, including a lock assembly, said receiving means being attached to said tray structure adjacent a forward portion thereof and spaced therebeneath extending vertically into gripping engagement with said striker stud means; and leg means fastened to opposite lateral sides of said tray structure rearwardly of said receiving means and extending in a diagonally forward direction intercepting the plane of said receiving means to engage a structural element of said automobile forwardly of said striker stud means for supporting said tray structure in a stable position, said leg means being selectively fastenable to said tray structure for adjustable leveling thereof, wherein said lock assembly includes a U-shaped frame, a thimble fastened to the floor of said frame over a striker stud passing aperture therein, a yoke swingably mounted in said frame and biased to enter a horizontal slot in the base of said thimble to be situated beneath the head of said striker stud and a tripping assembly for urging said yoke from beneath the head of said striker stud.

5. A mechanic's tray arrangement for use with an automobile hood latching mechanism, said arrangement comprising: a tray structure adapted to be spaced apart from the radiator of an automobile and extending forwardly therefrom; means for receiving the fixed striker stud means of said hood latching mechanism, including a lock assembly and a striker stud receiving pedestal means spaced laterally apart from said lock assembly, said receiving means being attached to said tray structure adjacent a forward portion thereof and spaced therebeneath extending into gripping engagement with said striker stud means; and leg means originating adjacent opposite lateral sides of said tray structure rearwardly of said receiving means and extending in a diagonally forward direction intercepting the plane of said receiving means to engage a structural element of said automobile forwardly of said striker stud means for supporting said tray structure in a stable position.

References Cited in the file of this patent

UNITED STATES PATENTS

| | | |
|---|---|---|
| 2,805,778 | Yordi | Sept. 10, 1957 |
| 2,901,303 | Anderson | Aug. 25, 1959 |
| 2,925,917 | Kammeyer | Feb. 23, 1960 |
| 2,958,566 | Buck | Nov. 1, 1960 |